United States Patent Office 3,337,467
Patented Aug. 22, 1967

3,337,467
DETERGENT COMPOSITIONS CONTAINING
2-DIOXY-1,2,5-OXATHIAZINE
George L. Broussalian, St. Louis, Mo., assignor to Monsanto Company, St. Louis, Mo., a corporation of Delaware
No Drawing. Filed May 12, 1965, Ser. No. 455,343
16 Claims. (Cl. 252—117)

This is a continuation-in-part of my copending United States patent application, Ser. No. 218,438, filed Aug. 21, 1962, now Patent No. 3,235,549.

This invention relates to novel soap compositions and more specifically, the present invention relates to processes for the manufacture of soap compositions containing 2-dioxy-1,2,5-oxathiazine compounds.

The novel 2-dioxy-1,2,5-oxathiazine compounds useful in the present invention are those compounds having a structure such as that shown in either Formula 1 or Formula 2:

(1)

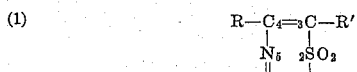

(2)

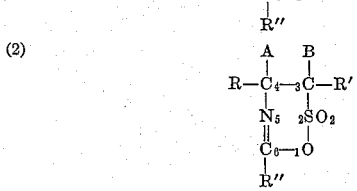

wherein R, R' and R" are selected from the group consisting of hydrogen and organic radicals; preferably those that contain at most 30 carbon atoms; and A and B are selected from the group consisting of hydrogen, halogens and organic radicals.

The processes of the present invention involve methods both for the manufacture of these novel 2-dioxy-1,2,5-oxathiazine compounds, and for their conversion into valuable surface active agents (sometimes called "surfactants"). One process for the manufacture of the 2-dioxy - 1,2,5 - oxathiazine compounds of this invention (which process constitutes one of the preferred embodiments of the invention) involves the reaction of (a) an organic compound having olefinic ("double bond") or acetylenic ("triple bond") unsaturation, such as an olefin or an alkyne, respectively,
(b) sulfur trioxide and
(c) a nitrile or hydrogen cyanide to form a 2-dioxy-1,2,5-oxathiazine ("inner anhydride") compound such as those shown in Formulae 1 and 2, above. Note that processes for the manufacture of any of these "inner anhydride" compounds whereby any one of (a), (b) or (c), above, is reacted with a reaction product of the other two are also within the scope of the present invention. For example, this particular aspect of the processes of this invention includes (1) the reaction of a β-sultone and/or carbyl sulfate type compound [products that can be made by reacting (a) with (b)] with a nitrile or HCN,
(2) the reaction of an olefin with a complex of sulfur trioxide plus an organic nitrile and
(3) the reaction of (a) with (b) in the presence of (c), for example, where (c) is used as a solvent.

Processes for the use of the novel 2 - dioxy - 1,2,5-oxathiazine compounds of this invention also constitute a preferred embodiment of the present invention. These processes involve the hydrolysis and/or neutralization of the "inner anhydride" compounds to yield valuable vicinal acylamido sulfonates, such as those that can be represented by Formulae 3 and 4:

(3)

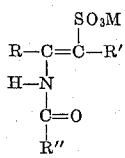

(4)

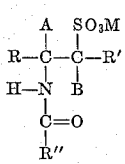

wherein R, R', and R", A and B have the same significance as they do in Formulae 1 and 2, above, and M is a cation.

Although the processes of the present invention can be utilized to great advantage for the manufacture of certain vicinal acylamido sulfonic acids and sulfonates that are particularly valuable lime soap dispersants, these processes can also be utilized for the manufacture of compounds other than those that are outstanding lime soap dispersants. For example, while R, R' and R" in Formula 1, above, must of necessity be relatively restricted in order for the formula to encompass those compounds that are most useful as lime soap dispersants, no such restriction is actually necessary insofar as the generic processes of the present invention are concerned. When all of R, R' and R" are very short organic radicals, or even hydrogen (and the compounds are consequently over-all more hydrophilic than those which are particularly useful as lime soap dispersants), the compounds can be utilized as wetting agents and dispersants in water slurries of inorganic and organic materials such as cement, kaolin, coal, oil well drilling muds and the like. Those compounds within this relatively lower molecular weight class of vicinal acylamido sulfonates (where R, R' and R" are either extremely short organic radicals or hydrogen, for example) that are very soluble in water can also be utilized as solubilizing agents in aqueous and aqueous-alcohol solutions (such as can be used in the formulation of liquid detergents) to aid in dissolving other ingredients, such as certain types of surface active agents including the widely used alkylaryl sulfonates and the vicinal acylamido sulfonate lime soap dispersants, mentioned heretofore, in these solutions. Under some conditions, these highly water-soluble compounds can also be used as complexing agents for the hardness ions in hard water. Conversely, when the vicinal acylamido sulfonate compounds are of significantly higher molecular weight than those that are particularly useful as lime soap dispersant compounds, the resulting higher molecular weight compound is generally fairly soluble in oil systems such as, for example, lubricating oils and can, typically, be used as oil-soluble surface active agents; for example, as oxidized oil sludge dispersants, spreading agents, emulsifying agents and the like, if desired.

Still another class of valuable surface active agents that can be manufactured via the processes of this invention is the class of vicinal higher alkyl acylamido ethyl sulfonates, the structure of which can be represented by Formula 4, above, if R and R' in Formula 4 are hydrogen and R" is a long chain alkyl group, generally containing at least about 15 carbon atoms in an aliphatic hydrocarbyl arrangement.

When R, R' and R" in the above formulae are organic radicals, they can be branched or unbranched to practically any degree, although it is preferred that they be substantially unbranched (straight-chain) and contain from 1 to 30 carbon atoms and that they be hydrophobic in nature. Still further preferred are those compounds wherein the total number of carbon atoms in R plus R', plus R'' is from 10 to 40. R, R' and R'' can also contain substituents, which do not render them substantially hydrophilic or water-soluble in nature, such as halides (including fluoride, chloride, bromide and iodide, for example) ester groups, ether groups, thioether groups, nitro groups, sulfone groups, sulfoxide groups, amide groups, carboxyl groups, nitroso groups and the like in their aliphatic or alicyclic radicals, without substantially eliminating the benefit that can result from the use of these compounds as surface active agents, detergents and/or lime soap dispersants. R, R' and R'' can also contain heterocyclic, monocyclic hydrocarbyl, polycyclic hydrocarbyl and substituted cyclic hydrocarbyl radicals (whether the rings thereof are saturated or not, although it is preferred that they be aliphatic or substituted aliphatic, rather than alicyclic or substituted alicyclic, radicals. It is additionally preferred that R and R' be of the type that does not ordinarily react readily with sulfur trioxide ($SO_3$) at a temperature below about 35° C, i.e., that they be, for example, saturated hydrocarbyl and halide-, nitro-, sulfone-, ether, thioether-, amido- and sulfoxide-substituted saturated hydrocarbyl radicals and the like. Typical, but non-limiting, examples of some of the 1,2,5-oxathiazine compounds of the present invention include 2-dioxy-3,4-dihydro-4-tetradecyl-6-methyl-1,2,5-oxathiazine;
2-dioxy-3,4-dihydro-3-methyl-4-ethyl-6-ethyl-1;2,5-oxathiazine;
2-dioxy-3,4-dihydro-3-ethyl-4-nonyl-6-allyl-1,2,5-oxathiazine;
2-dioxy-3-hexadecyl-6-phenyl-1-2,5-oxathiazine;
2-dioxy-3,4-dihydro-3,4-diisobutyl-6-β-methoxyethyl-1,2,5-oxathiazine;
2-dioxy-3,4-dihydro-4-dodecyl-1,2,5-oxathiazine;
2-dixoy-3,4-difluoro-4-perfluoroctyl-6-trifluoro-methyl-1,2,5-oxathiazine;
2-dioxy-3,4-dihydro-3-(7,8-dichlorohexadecyl)-6-chloromethyl-1,2,5-oxathiazine;
2-dioxy-3,4-dihydro-4-(p-octyl phenyl)-6-methyl-1,2,5-oxathiazine;
2-dioxy-3-carbethoxy-4-hexadecyl-6-β-bromoethyl-1,2,5-oxathiazine;
2-dioxy-4-decyl-6-propyl-1,2,5-oxathiazine;
2-dioxy-3,4-dihydro-4-cyclohexyl-6-hexyl-1,2,5-oxathiazine;
2-dioxy-3,4-dimethyl-6-benzyl-1,2,5-oxathiazine;
2-dioxy-3,4-dihydro-6-methyl-1,2,5-oxathiazine;
2-dioxy-3-ethyl-4-methylisobutyl-6-ethenyl-1,2,5-oxathiazine;
2-dioxy-3,4-dichloro-4-indole-6-n-propyl-1,2,5-oxathiazine;
2-dioxy-6-tetradecyl-1,2,5-oxathiazine;
2-dioxy-6-(n-propyl-3-N-ethylamino)-1,2,5-oxathiazine;

and the like.

One of the embodiments of the processes of this invention encompasses the step of sulfonating an organic unsaturated compound in order to make a sulfocyclic compound such as a sultone or a carbyl sulfate type compound that is useful as an intermediate for the subsequent steps of these processes. Practically any organic aliphatic alicyclic, substituted aliphatic or substituted alicyclic compound having one or more double or triple bonds connecting any two adjacent carbon atoms in the aliphatic portion of its molecule can be utilized as a raw material in the processes of the present invention, although generally those that are monounsaturated; i.e., those having a sole, double or triple bond in the aliphatic portion of their molecules are preferred.

Those that have their unsaturated position at one end of their carbon chain are particularly preferred. These unsaturated compounds can be branched or unbranched to practically any degree without substantially eliminating the benefits that can accrue to those who utilize the processes of the invention. In addition, these compounds can contain practically any number of carbon atoms desired (except one), for example, from 2 to 30 or more. However, it is generally preferred, particularly for the ultimate manufacture of the novel lime soap dispersant compounds mentioned above, that there be between 10 and 26 carbon atoms therein. Still further preferred are the straight-chain unsaturated compounds that contain from 14 to 22 carbon atoms. (Stated in terms of the 2-dioxy-1,2,5-oxathiazine compounds of this invention, with reference to Formulae 1 and 2, above, R and R' can contain a combined total of from 0 to 28 or more carbon atoms, but it is sometimes preferred that they contain from 8 to 24 carbon atoms. Still further preferred are those compounds wherein the number of carbon atoms in R plus R' is from 12 to 20, while R'' contains up to 10 carbon atoms, but, preferably, is either a lower alkyl or a lower alkenyl group or radical. Compounds where R and R' are hydrocarbyl and/or alkyl groups are still further preferred. Since R and/or R' can also preferably be hydrogen, it is convenient to state the fact that R and R' are preferably alkyl groups containing a combined total of carbon and hydrogen in a weight ratio of from about 144:25 [i.e., $\cong C_{12}H_{25}$] to about 240:41 [i.e., $\cong C_{20}H_{41}$], and R'' is a hydrocarbyl group, wherein the weight ratio of carbon to hydrogen is from 0:1 [where R'' is H] to about 10:21 [where R'' is $C_{10}H_{21}$], and preferably is from about 12:3 to about 60:11.) The unsaturated compound that can be used as a raw material for certain of the processes of this invention can also contain heterocyclic, monocyclic hydrocarbyl and polycyclic hydrocarbyl radicals (whether the rings thereof are saturated or not). It can also contain substituents such as halides (including fluoride, chloride, bromide and iodide, for example), carboxyl groups, ether groups, thioether groups, nitro groups, sulfone groups, sulfoxide groups, amide groups, carbonyl groups, nitroso groups, sulfonate groups and the like in their chains, without detracting substantially from the advantages of using the processes of this invention. Essentially all that is necessary is that there be two carbons in the molecule that are connected by an olefinically unsaturated (double) or an acetylenically unsaturated (triple) bond. It is preferred, however, that any substituents on the aliphatic portion of the unsaturated material be of the type that do no ordinarily react with sulfur trioxide ($SO_3$) at a temperature below about 35° C., such as the halides mentioned above, nitro groups, sulfone groups, ether groups, thioether groups, amide groups, sulfoxide groups and the like. Non-limiting typical examples of unsaturated compounds that can be utilized in the processes of this invention include, for example, ethylene; propylene, isomeric compounds (and mixtures thereof) of various types of hydrocarbyl olefins including butene, pentene, hexene, heptene, octene, nonene, decene, undecene, dodecene, tridecene, tetradecene, pentadecene, hexadecene, heptadecene, octadecene, nondecene and the like, including those having either normal (straight) and branched carbon chains; cyclopentene, cyclohexene; pentene dimer; octalin; cracked wax olefins; polymeric lower alkyl olefins, such as ethylene, propylene, butylene, isobutylene, pentene, hexene, etc., and mixtures thereof, camphene, pinene, tall oil unsaturates and other naturally occurring olefinic terpenoid compounds, as well as synthetic derivatives thereof; unsaturated fatty acids, including oleic acid, linolenic acid, and the like; dehydrated organic alcohols such as those derived by dehydrating hydrogenated fatty acids and by dehydrating such other alcohols as the "oxo" alcohols, the so-called "Ziegler" alcohols and the so-called "Fischer-Tropsch" alcohols, for example;

1,2-dichloroethylene; 1,2-dichloro-1-butene; tetrafluoroethylene and lower molecular weight polymerized tetrafluoroethylenes; 3,4-dibromo-3-dodecene; 1,2-diiodo-1-hexadecene; 1-nitroso-2-octene; p-nitrostyrene; oleiamide; 1-methoxy-2-octadecene; and the like.

Acetylenically unsaturated compounds, corresponding to practically all of the immediately foregoing examples of olefinically unsaturated compounds, can also be utilized for reaction with the sulfur trioxide in a manner similar to that whereby sulfur trioxide is reacted with one of the olefins, although olefins are preferred for use in the processes of this invention. When an acetylenically unsaturated compound is utilized, the 2-dioxy-1,2,5-oxathiazine compound that results therefrom will have a structure corresponding to Formula 1, above.

The actual source of sulfur trioxide for reaction with one of the unsaturated compounds described heretofore in the processes of this invention generally has no practical effect upon the basic outcome of these processes. Practically any source can be utilized. For example, relatively pure $SO_3$ can be utilized, if desired, in the liquid, solid or gaseous state. Since sulfur trioxide alone is an extremely powerful sulfonating agent, generally it is preferred that the $SO_3$ be utilized in the form of a more dilute or less reactive form, such as, for example, as a mixture with liquid or gaseous $SO_2$, or with dry air, or as concentrated (fuming) sulfuric acid, chlorosulfonic acid, or as a complex with such agents as pyridine, dioxane, thioxane, alkylphosphate, and the like.

The preferred product from the reaction of $SO_3$ with the unsaturated compound is a β-sultone (3)
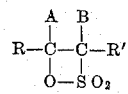

wherein R, R' and A and B can be either hydrogen or organic radicals which are part of the original olefins described above. When an alkynyl (acetylenically unsaturated) compound is used as a starting material rather than an olefinically unsaturated compound, A and B will generally be nothing. Thus, the "vicinal" carbons will be unsaturated. Note that the sultone preferably bridges the carbons (of the unsaturated material) that were connected with the double or triple bond before the reaction of $SO_3$ therewith. Sulfonation of the unsaturated compound is ordinarily carried out at a temperature below about 70° C., down to as low as —40° C. or even lower, and preferably at a temperature between about —30° C. and about 30° C. in order to prevent both undesirable degradation of the "raw" organic material due to undesired and uncontrollable reaction of the $SO_3$ at higher temperatures, and spontaneous decomposition of the sultone reaction products (which can occur when the sultone is exposed to the higher temperatures, for example, above about 50° C., particularly if the sultone is not relatively pure). Generally excess (over the theoretical stoichiometric amount) of $SO_3$ is utilized in the sulfonation reaction in order to drive the reaction to as complete a level as is practical or possible in a relatively short time.

Sometimes when such excess (over the theoretical stoichiometric amount) of sulfur trioxide is utilized, or when excess sulfur trioxide is available for reaction at some point during the sulfonation of the unsaturated organic material, some carbyl sulfate type compounds are formed in the reaction mixture rather than the expected sultone. The presence of carbyl sulfate type compound, however, is not substantially deleterious to the over-all processes of this invention, because it can be reacted with HCN or an organic nitrile in a manner similar to that wherein the sultone is reacted with these materials in accordance with the processes of this invention. Hence, carbyl sulfate type compounds and the β-sultone compounds corresponding thereto will be considered herein as practically identical, insofar as their utilization in the over-all processes of the invention is concerned. Together the β-sultone compounds and carbyl sulfate type compounds will herein be termed "preferred sulfocyclic compounds."

Sulfonation of the unsaturated materials to produce the preferred sulfocyclic compounds can be effected in either a solvent or a slurry that is fluid at the temperature at which the reaction is conducted. The solvent (or continuous phase in the slurry system) should ordinarily be one which is inert to the reactants (especially sulfur trioxide) and does not unfavorably affect the reaction. Typical examples of solvents that can be utilized include carbon tetrachloride, ethylene dichloride, ethylene dibromide, trichloroethylene, tetrachlorethane, chloroform, liquid sulfur dioxide, diethyl ether, acetic anhydride, dioxane, methylene chloride, acetic acid propionic acid, propionic anhydride, pyridine, cyclohexane, hexane, petroleum ether, naphtha, thioxane and the like.

The sultone reaction product described above need not be isolated after it is formed in accordance with the above-described sulfonation step (indeed, in some instances, it is not absolutely certain that a stable "sultone" compound is formed). Hence, it may sometimes be more desirable in the processes of the invention not to isolate and/or purify the product from the sulfonation step described above. The sultone is ordinarily stable under reasonable conditions, however, and therefore can be isolated in most instances, if desired.

As it was indicated above, however, the sultone itself can be utilized as a raw material, if desired, in the manufacture of the 2-dioxy-1,2,5-oxathiazine compounds of this invention, to thereby eliminate the necessity of the sulfonation step. Some sultones are readily available and well-known materials, and can be obtained by a variety of known processes in addition to the sulfonation procedure described above. One method employs the treatment of an olefinically unsaturated alcohol wherein the OH group of the alcohol is attached to a carbon atom adjacent to those carbon atoms connected by the double bond (such as, for example, 1-octadecene-1-ol) with an alkali metal bisulfite such as sodium bisulfite in the pressure of air to give the corresponding hydroxyalkanesulfonate; hydroylsis of the resulting sulfonate to the sulfonic acid; and ring closure of the latter, e.g., by heating carefully to give the sultone. Another method involves the sulfohalination of an alkyl halide, for example, to give a haloalkanesulfonyl halide, hydrolysis of the sulfonyl halide, and ring closure of the hydrolysis product (with hydrohalide evolution) to give the alkanesultone.

The amidation of the sultone (or one of the products of the reaction of sulfur trioxide with an unsaturated compound as described above, which product has not necessarily been specifically isolated and identified as a sultone, but which can react with a nitrile or a cyanide as can a β-sultone) in accordance with the processes of the present invention can ordinarily be accomplished by simply intermixing the sultone (or the above-described reaction product) with either HCN or an organic nitrile (sometimes termed an organic cyanide compound). The immediate product from the reaction of the sultone with the nitrile or HCN is a so-called "inner anhydride," a novel intermediate compound believed to have a structure such as that shown in either Formula 1, or Formula 2, above. Compounds having this structure are termed "2-dioxy-1,2,5-oxathiazine compounds." For convenience, the positions in the "inner anhydride" ring of the Formulae 1 and 2 have been assigned the Arabic numerals shown therein. Note that R, R', R", A and B are selected from the group consiting of organic radicals and hydrogen, although it is preferred that R and R' be organic radicals that cannot readily be reacted with $SO_3$ at temperatures below about 35° C. The source of R and R', A and B is the unsaturated material that was utilized in the formation of sultone and R and R' can have substantially all of the basic structure (other than the degree of unsaturation) and substituents of the unsaturated materials mentioned above, from which the inner anhydride compounds can be derived. R" is derived from the C≡N containing compound that was reacted with the sultone in the amidation step described above. For example, when 2,3-difluoro-2-hexadecene is sulfonated as described above, and amidated with acetonitrile, R is $C_{13}H_{25}$, R' is $CH_3$, A and B are F, and R" is $CH_3$ in the resulting 2-dioxy-1,2,5-oxathiazine compound. When HCN is utilized in the amidation step, R" in the inner anhydride is H, and when an organic nitrile is utilized, R" is the same as the organic portion of the organic nitrile. This amidation step can preferably be accomplished in the presence of one of the solvents described above.

The processes of the present invention can be used to manufacture any of the 2-dioxy-1,2,5-oxathiazine compound encompassed by Formulae 1 and 2, above. The sub-generic 2-dioxy-1,2,5-oxathiazines that can be utilized as intermediates for the manufacture of certain of the special lime soap dispersants and generally useful surfactants (mentioned heretofore) are the 3- and/or 4- and/or 6- (aliphatic, alicyclic, substituted aliphatic or substituted alicyclic) substituted - 2 - dioxy - 3,4 - dihydro-1,2,5-oxathiazines; wherein the total number of carbon atoms in the combined substituents on the 3- and 4- positions is from 8 to 24 and preferably from 12 to 20, and the preferred substituents on the 3- and 4- positions are saturated aliphatic or halogen-substituted saturated aliphatic in nature. Still further preferred for this use are those 2-dioxy-1,2,5-oxathiazines having this number of carbon atoms on the 3- or 4- position, but which are only mono-substituted in either the 3- or 4- position; that is, where there are a total of 3 hydrogens attached to the 3- and 4- positions of the "inner anhydride" ring. In addition, the 6- position should contain either hydrogen or a saturated aliphatic hydrocarbyl or halogen-substituted saturated hydrocarbyl radical containing from 1 to 8, and preferably from 1 to 5 carbon atoms.

The 2-dioxy-1,2,5-oxathiazine compounds of this invention can be readily isolated from the solvent, if desired, generally by simply filtering the crystalline inner anhydride material after it is precipitated from ethyl ether solvent, for example, or from water upon being cooled to about 0° C. They are generally crystalline materials and can be readily handled, ground, packaged and sold in this form, or dispersed in a solvent or other non-aqueous medium. The inner anhydride 2-dioxy-1,2,5-oxathiazine compounds (and compositions containing them) constitute one of the particularly preferred embodiments of the present invention.

Actually those nitriles such as, for example, acetonitrile, acrylonitrile, propionitrile and benzonitrile which can be readily maintained in the liquid state at the reaction temperature at which the sulfonation step described above is carried out (when such a step is utilized in the processes of this invention), or which are liquid below about 35° C. at one atmosphere of pressure, can serve not only as excellent solvents or dispersants for the unsaturated "raw" material during the sulfonation step, but also as the amidating agent in the amidation step of the processes of this invention. When one of these nitriles is utilized as a solvent, the amidation and sulfonation steps generally effectively occur practically simultaneously, since as soon as the sulfur trioxide reacts with the unsaturated material, the nitrile (solvent) reacts with the resulting reaction product; generally a β-sultone (rather than the γ-sultone which sometimes forms in minor amounts during the above-described sulfonation of the unsaturated material); and thereby produces the appropriate oxathiazine inner anhydride, the particular characteristics of which will depend upon the particular organic unsaturate and nitrile raw materials that are utilized in the process. Thus, to a solution or dispersion of an olefin such as 1-dodecene dissolved in acetonitrile can be slowly added one of the above-described sulfonating agents in an amount generally at least approximately equivalent to the stoichiometric amount (and preferably somewhat in excess of this amount) required to convert the olefin to a sultone. By maintaining the temperature of the solution below about 15° C., and preferably below about —5° C., undesirable degradation reaction of the sulfur trioxide with the nitrile (the solvent-amidating agent in this particular procedure) can be minimized or avoided. Generally the lower the temperature, the less nitrile degradation products are generated during the unsaturate sulfonation reaction. The acetonitrile solvent in this example reacts with the product of the reaction of the unsaturate with the $SO_3$ practically immediately to yield the inner anhydride compound, 2-dioxy-3,4-dihydro-4-decyl-6-methyl-1,2,5-oxathiazine.

The utilization of one of the above-described organic nitrile compounds as a solvent in which the desired reaction of $SO_3$ with one of the above-described unsaturated compounds can be performed makes possible another approach toward the manufacture of the compounds of this invention. In this approach, the discovery that at very low temperatures (0° C., and practically invariable below about —10° C. or even colder), crystalline complexes of sulfur trioxide and the solvent-nitriles can be readily manufactured, isolated and utilized in a relatively pure form when desired, is advantageously applied. In order to make the nitrile-sulfur trioxide complex, one needs merely to intermix sulfur trioxide with the liquid nitrile (in the substantial absence of water but preferably in a non-polar solvent) and maintain the temperature of the resulting mixture at the above-described levels until, generally within a reasonably short time, crystals of the complex precipitate from the solution. The complex contains about one mole of $SO_3$ per mole of nitrile. The crystals can be isolated then by filtering them from any excess nitrile solvent that may be present. They can be utilized as an effective (combination) sulfonation-amidation agent for one of the unsaturated "raw material" compounds described above, in practically any of the processes of this invention that involve the sulfonation of an olefinically or acetylenically unsaturated compound, either via the utilization of any of the aforementioned generally useful solvents (for the sulfonation step) as was described above, or via the utilization of one of the nitrile-solvents described in the immediately foregoing paragraph. No matter in what particular procedure the nitrile-sulfur trioxide complex is utilized, an advantage that results from its use is that the sulfur trioxide contained therein generally reacts in a substantially milder manner than does or would sulfur trioxide under otherwise similar conditions, but in the uncomplexed state. Note also that the sulfur trioxide is readily available to react in any of its usual ways (except in a milder manner) even though it is in the form of a nitrile-sulfur trioxide complex. When the complex is utilized in the processes of the present invention to sulfonate an olefin, the sulfonation reaction leaves the nitrile portion of the complex substantially unchanged and free to react, for example, with the $SO_3$-unsaturate reaction product (one of the preferred sulfocyclic compounds) in the processes of this invention.

It is generally desirable, in the amidation step of the present invention to intermix an excess of HCN or organic nitrile (over the theoretical stoichiometric amount required to convert the sultone to the inner anhydride) in order to make it possible to perform the amidation in as short a time as possible. Since the organic nitriles are often also excellent solvents for the sultones, there is essentially no upper limit to the amount of organic nitrile material that can be used in the processes of this invention in order to carry out the desired amidation reaction. Generally, it is preferred, however, that at least the stoichiometric amount (based on the amount of preferred sulfocyclic compounds; i.e., $SO_3$-unsaturate reaction products; utilized in the process) required to amidate the sulfocyclic compound be used. It is believed that the cyanide material reacts with the β-sultone compound or the carbyl sulfate type compound on a molar equivalent basis; i.e., one cyanide group reacts with one sultone or one carbyl sulfate group to give the desired 2-dioxy-1,2,5-oxathiazine compound (or the desired vicinal acylamido sulfonic acid after hydrolysis of the initially formed inner anhydride).

Although the formation of sulfur trioxide-organic nitrile complexes is broadly applicable to nitriles that are liquid at a temperature of about −5° C., or lower, or which can be dissolved to at least the extent of about 5 weight percent (at −5° C.) in a solvent (such as those described above that are useful in processes for the sulfonation of olefins) that is fluid (a liquid) at such low temperatures and is practically inert to sulfur trioxide at these temperatures, those which are preferred for use in the processes of the present invention include only those having from 2 to 8 carbon atoms in their molecules, such as, for example, acetonitrile, acrylonitrile, fluoracetonitrile, trichloroacetonitrile, α-methylacrylonitrile, α-chloroisobutylronitrile, propionitrile, isobutyronitrile, α-ethylacrylonitrile, butyronitrile, crotononitrile, allyl cyanide, methoxyacetonitrile, α-hydroxy-isobutyronitrile, chloroacetonitrile, α-bromoisobutyronitrile, diethylacetonitrile, β-methoxypropionitrile, benzonitrile, ethylcyanoacetate, cyanogen, chlorocyanogen, β-hydroxybutyronitrile and the like. Of these the saturated hydrocarbyl and halogen-substituted saturated hydrocarbyl nitrile (or organic cyanide) compounds are still further preferred. One reason why these particular nitrile compounds are preferred is because they ordinarily need not be dissolved in a solvent in order to form a complex with sulfur trioxide.

During the sulfonation and amidation steps described above, it is preferred that the chemical reactions that occur therein be performed substantially in the absence of water, particularly when optimum yields of the vicinal acylamido sulfonates are desired.

In order to convert any of the desired 2-dioxy-1,2,5-oxathiazine compounds to the corresponding vicinal acylamido sulfonic acid, one need merely intermix them in any particularly desired or convenient manner with at least about one mole of water per mole of inner inhydride compound, and warm the resulting mixture to a temperature above about 50° C., and preferably above about 75° C. If it is desired to convert a portion of the inner anhydride material, less than this amount of water can be used. Note that when compounds containing more than one point or position of olefinic or acetylenic unsaturation (or more than one sultone or carbyl sulfate group per molecule) are utilized as raw materials in the processes of this invention, the 2-dioxy-1,2,5-oxathiazine compounds resulting therefrom can have more than one "inner anhydride" ring such as that shown in Formulae 1 and 2, above, per molecule. Thus, when more than one 2-dioxy-1,2,5-oxathiazine ring is present per molecule proportionately more water than one mole per mole of the oxathiazine compound must be utilized in order to hydrolyze all of the inner anhydride rings to the appropriate vicinal acylamido sulfonic acid groups. In order to manufacture a vicinal acylamido sulfonate in accordance with these processes, the vicinal acylamido sulfonic acids can be neutralized with any desired base in either water or a nonaqueous solvent, depending upon the solubility characteristics of the particular acid and base that are utilized. Practically any base that is stable either per se or in aqueous solution at about room temperature and under about one atmosphere of pressure can ordinarily be utilized to convert these sulfonic acids to the corresponding sulfonates. Inorganic bases having metal cations are generally preferred for this purpose, although any organic base that can ionize to at least some extent in an aqueous system can also be utilized.

Particularly preferred are the alkali metal cation bases such as alkali metal hydroxides, carbonates, silicates, bicarbonates and the like (and of these, sodium and potassium bases are generally preferred because of economic as well as other considerations) and alkaline earth metal cation bases such as calcium hydroxide, calcium carbonate, magnesium hydroxide, magnesium carbonate and the like. Ammonium hydroxide can also often be utilized to advantage in the neutralization of these vicinal acylamido sulfonic acids. Water-soluble and/or water-dispersible bases can conveniently be present in the water that is utilized to hydrolyze the inner anhydride compounds (described above) if desired, to thereby effectively hydrolyze the 2-dioxy-1,2,5-oxathiazine ring and neutralize the resulting acid at practically the same time. Sometimes only a small amount of water (or even none in some instances) is necessary when the hydrolysis and neutralization steps are performed simultaneously. For example, when an alkali metal hydroxide such as sodium, potassium or lithium hydroxide, is utilized after it has been dissolved in an organic solvent such as methanol or ethanol, essentially no water at all is needed for the hydrolysis of the 2-dioxy-1,2,5-oxathiazine compound and the formation of the corresponding alkali metal vicinal acylamido sulfonate.

It is another advantage of the present invention that the hydrolysis and neutralization of the 2-dioxy-1,2,5-oxathiazine compounds can be carried out while the oxathiazine is in physical contact with soap. Thus, soap compositions that have excellent over-all detergent properties, and that are additionally valuable because they can form effectively dispersed lime soap curds when they are dissolved in hard water, can be manufactured directly, if desired, in conventional soap equipment such as a crutcher, or in practically any mixing vessel that can be used to formulate soap (i.e., in which molten soap can be handled), such as a conventional amalgamator, a conventional "refiner," or even a conventional soap mill. Since the temperature of the soap when it is in a molten state is generally fairly high, essentially all that is usually necessary to perform the hydrolysis and neutralization of the 2-dioxy-1,2,5-oxathiazine compound (admixed with the soap) is that both an effective amount of the oxathiazine compound and a sufficient quantity of the particular base that is to be employed for the neutralization step be well mixed through the soap while the soap is in the molten state. Usually the small amount of moisture that the molten soap contains is enough for the hydrolysis and neutralization of the oxathiazine to be performed without the necessity of adding water to the molten soap-oxathiazine composition or blend, although some water can be added to speed up the rate of hydrolysis and neutralization of the oxathiazine compound if desired. For this particular neutralization technique, the oxathiazine compound (and the base) can be blended with the soap either before or after the soap is made molten, depending upon the particular manipulative procedure desired. It is generally preferred, however, that an alkali metal hydroxide such as potassium or sodium hydroxide be used when the oxathiazine compound is hydrolyzed and neutralized "in situ," i.e., in physical contact with the soap. Such "in situ" processes wherein the conversion of 2-dioxy-1,2,5-oxathiazine compounds are converted to their corresponding vicinal acylamido sulfonates while they are in intimate physical contact with a soap which reacts with the calcium, magnesium, and/or iron ions in hard water to yield a water insoluble "lime soap" curd constitute preferred embodiments of the present invention.

After the conversion of the oxathiazine compound to the corresponding vicinal acylamido sulfonate via this technique, the soap-sulfonate compositions can generally be handled via conventional techniques and equipment in a manner similar to that in which plain or conventional soap is handled; for example, through the usual plodding, sizing, cooling, stamping and packaging operations. Generally, when the valuable oxathiazine compounds of this invention (which are particularly useful as lime soap dispersants) are intermixed with soap in accordance with the aforementioned processes, they can be intermixed with the soap in practically any weight ratios. However, it is generally preferred that the weight ratio of oxathiazine compound (and resulting vicinal acylamido sulfonate) to soap in the resulting "lime soap dispersed" compositions be between about 5:100 and about 70:100. Still further preferred are those mixtures containing from about 10 to about 50 weight percent of the oxathiazine compound (or corresponding vicinal acylamido sulfonate), based on the combined weight of soap and the compound of the present invention.

The 2-dioxy-1,2,5-oxathiazine compounds of this invention have the peculiar ability to apparently become converted to the corresponding vicinal acylamido sulfonic acids upon being heated in the presence of water (but in the absence of base) as described above. The presence of one or more bases in the aqueous media containing one or more of the 2-dioxy-1,2,5-oxathiazine intermediate compounds of this invention makes it possible to hydrolyze the "inner anhydride" ring at a lower temperature than would otherwise be expected (of the pure intermediate compounds in neutral or acidic aqueous media, for example).

Processes wherein a vicinal hydroxy sulfonic acid is esterified (in a manner such as that set out in copending application, Ser. No. 218,437) and subsequently amidated (i.e., where the vicinal acyloxy sulfonic acid resulting from such as esterification is reacted with one of the above-described cyanide or nitrile compounds to yield one of the 2-dioxy-1,2,5-oxathiazine compounds of this invention) constitute a second important way in which the 2-dioxy-1,2,5-oxathiazine compounds of the present invention can be manufactured. One can, for example, (a) hydrolyze a fairly pure sultone in order to obtain the corresponding vicinal hydroxy sulfonic acid in a fairly pure state, (b) esterify the resulting hydroxy sulfonic acid to obtain a vicinal acyloxy sulfonic acid, (c) amidate the acyloxy sulfonic acid with an organic nitrile or hydrocyanic acid to obtain one of the 2-dioxy-1,2,5-oxathiazine compounnds of this invention.

In the following examples, which are illustrative of some of the preferred embodiments of the present invention, all parts given are by weight unless otherwise specified.

EXAMPLE I

Into a reaction vessel such as that described in Example II, below, are charged 2,000 parts of acetonitrile, 500 parts of chloroform and 200 parts of 1-n-hexadecene. Over a period of about 1 hour, 100 parts of liquid sulfur trioxide are added to the resulting solution while fairly violent stirring is maintained. The temperature of the resulting mixture is maintained between about 0° C. and 10° C. After the sulfur trioxide has been added to the nitrile, the reaction mixture is stirred for an additional 2 hours. A small amount of the reaction product (from this combined sulfonation-amidation step) is withdrawn and warmed to about 50° C. to evaporate the excess acetonitrile and chloroform solvents. The product that remains after the evaporation of these materials is practically pure 2-dioxy-3,4-dihydro-4-n-tetradecyl-6-methyl-1,2,5-oxathiazine (inner anhydride). It contains a small amount of unreacted hexadecene, which can be removed therefrom by extraction of the somewhat gummy residue with petroleum ether, a small amount of hydroxy-n-hexadecane-1-sulfonic acid and a small amount of unamidated sultone.

After the extraction with petroleum ether, the remaining product is intermixed with an equal amount of glacial acetic acid and warmed to about 50° C. in order to convert the sultone to the corresponding vicinal acetoxy-n-hexadecane-1-sulfonic acid. Then 100 parts of water are added to the resulting product, which is warmed to and maintained at about 80° C. for an additional hour, during which time the inner anhydride compound is hydrolyzed to the corresponding 2-acetamido-1-n-hexadecanesulfonic acid. The hydolyzed mixture is then neutralized with sodium hydroxide to a pH of 8. Upon subsequently being cooled to about 0° C., crystals settle out of the aqueous mixture which are removed by filtration and dried to yield a product which is an excellent detergent and lime soap dispersant. It contains about 90% of sodium 2 - acetamido - 1 - n-hexadecanesulfonate and about 10% of sodium 2-acetoxy-1-n-hexadecanesulfonate.

Example II, below, is typical of the embodiments of the present invention that involve the distinctly stepwise reaction of (a) an olefinically or acetylenically unsaturated organic compound, (b) sulfur trioxide and (c) an organic nitrile wherein (a) is α-tetradecene, (b) is sulfur trioxide dissolved in a sulfur dioxide diluent or solvent and (c) is acetonitrile.

EXAMPLE II

To a solution of 500 parts of α-tetradecene in 500 parts of ethyl ether, all in a conventional glass lined reaction vessel fitted with an explosion proof stirring motor and an impeller type stirrer that is capable of violently agitating the contents of the reaction vessel, are added, over a period of at least about 120 minutes with violent stirring, a solution of 200 parts of sulfur trioxide dissolved in 1,000 parts of sulfur dioxide. The temperature of the reaction mixture is maintained below about 0° C. during the addition of the sulfur trioxide and for 30 minutes thereafter, by externally cooling the reaction vessel and by evaporation of sulfur dioxide from the reaction mixture.

One thousand parts of acetonitrile are slowly stirred into the resulting reaction mixture over a period of about 5 minutes. The temperature of the resulting blend is maintained below 0° C. by additional evaporation of sulfur dioxide. After 3 hours, all of the $SO_3$-olefin reaction product (sultone) has been reacted with the acetonitrile to yield the desired 2-dioxy-3,4-dihydro-4-dodecyl-6-methyl-1,2,5-oxathiazine (inner anhydride) compound. The mixture is then warmed slowly to room temperature in order to expel the remaining sulfur dioxide and a small amount of excess sulfur trioxide. The excess acetonitrile is subsequently removed by distillation in vacuo at about 50° C. The residue after removal of the solvent is practically pure 2-dioxy-3,4-dihydro-4-dodecyl-6-methyl-1,2,5-oxathiazine.

EXAMPLE III

Into a reaction vessel such as that described in Example II, above, are charged 1,000 parts of acetonitrile. The vessel is fitted with a sparge tube which opens just below the outer edge of the impeller. The acetonitrile is cooled to a temperature of −30° C. Then, over a period of 2 hours, 200 parts of sulfur trioxide vapor are conducted into the vessel through the sparge tube while the mixture is being intensely agitated and maintained at a temperature below −10° C. A crystalline precipitate is observed in the reaction vessel after about 30 minutes, which precipitate increases in volume as additional $SO_3$ is injected into the cold acetonitrile. After all of the $SO_3$ is added, the mixture is stirred for an additional 15 minutes and then filtered with care to prevent the temperature of the crystals from rising above about −10° C., and to prevent contact of the crystals with a significant amount of moisture. The crystals are a complex of acetonitrile and sulfur trioxide which complex, upon hydrolysis with water, yields sulfuric acid and acetonitrile.

One hundred fifty parts of the crystalline acetonitrile-sulfur trioxide complex are added slowly (over a period of 2 hours) to a solution of 200 parts of α-n-butene dissolved in 5,000 parts of ethylene dichloride in a reaction vessel such as that described in Example II, above. During this addition, the temperature in the vessel is maintained at about −20° C. by means of external cooling through the walls of the reaction vessel. At the end of this time the ethylene dichloride and excess $SO_3$, butene and acetonitrile are driven from the reaction vessel by heating to a temperature of about 30° C. in vacuo. The resulting viscous product is largely (ca. 90%) the desired inner anhydride, 2-dioxy-3,4-dihydro-4-ethyl-6-methyl-1,2,5-oxathiazine.

Any organic nitrile that can itself be manufactured, can be utilized in those processes of this invention involving the manufacture of the novel 2-dioxy-1,2,5-oxathiazine compounds of the invention, illustrated in Formulae 1 and 2, above. For example, in addition to those specifically mentioned above, such nitriles as trimethylacetonitrile, isovaleronitrile, α-furonitrile, isocapronitrile, lactonitrile, 2-tolunitrile, benzyl cyanide, 1,4-dicyanobutane,- heptamethylenedicyanide, mandelonitrile, 2-cyanopyridine, t - butylacetonitrile, 4-fluorobenzonitrile, 6-nitro-2-tolunitrile, 5-chloro-2 - nitro-4 - tolunitrile, fumaronitrile, cyanocyclohexane, 5 - bromosalicylonitrile, 2 - cyanobenzoic acid, and the like.

What is claimed is:

1. A process for manufacturing a detergent material, which process comprises forming a blend by intermixing in a weight ratio of from about 100:5 to about 100:70 a soap and a 2-dioxy-1,2,5-oxathiazine compound having a formula selected from the group consisting of

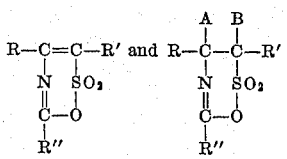

wherein R and R' are hydrophobic radicals selected from the group consisting of hydrogen, alicyclic and aliphatic radicals containing from 1 to 22 carbon atoms; R and R' having a combined total of from 8 to 22 carbon atoms, and at most one of R and R' being hydrogen; R" is selected from the group consisting of hydrogen and lower alkyl radicals; and A and B are selected from the group consisting of hydrogen, halogens, lower alkyl radicals and halogen-substituted lower alkyl radicals; and hydrolyzing said 2-dioxy-1,2,5-oxathiazine compound by heating said blend in the presence of a base selected from the group consisting of alkali metal, alkaline earth metal and ammonium bases to the corresponding vicinal acylamido sulfonate.

2. A process as in claim 1, wherein said base is an alkali metal hydroxide.

3. A process for manufacturing a detergent composition exhibiting improved lime soap dispersant properties when it is dissolved in hard water, which process comprises (a) forming a blend by intermixing in a weight ratio of from about 100:5 to about 100:70 soap and a 2-dioxy-3,4-dihydro-1,2,5-oxathiazine compound having, at the 3- and 4- positions, a substituent group selected from the group consisting of hydrogen, aliphatic groups, and alicyclic groups; the sum of the total number of carbon atoms in said groups at said 3- and 4- positions being from 8 to 24; and at the 6- position a substituent group selected from the group consisting of hydrogen, aliphatic groups, containing from 1 to 10 carbon atoms, and alicyclic groups, containing from 1 to 10 carbon atoms; and (b) hydrolyzing said 2-dioxy-3,4-dihydro-1,2,5 - oxathiazine compound to the corresponding vincinal acylamido sulfonate by heating said blend in the presence of a base selected from the group consisting of alkali metal, alkaline earth metal, and ammonium bases.

4. A process for manufacturing a detergent composition which comprises forming a blend by intermixing soap with a 2-dioxy-3,4-dihydro-1,2,5-oxathiazine compound having alkyl substituents at the 3- and 4- positions containing a combined total of from 12 to 20 carbon atoms and an alkyl group of not more than ten carbon atoms containing carbon and hydrogen in a weight ratio, respectively, of from 0:1 to 60:11 at the 6- position, and hydrolyzing said 2-dioxy-3,4-dihydro-1,2,5 - oxathiazine compound to the corresponding vicinal acylamido sulfonate by heating said blend in the presence of a base selected from the group consisting of alkali metal, alkaline earth metal, and ammonium bases; the weight ratio of said oxathiazine compound to said soap in said blend being between about 5:100 and about 70:100.

5. A process as in claim 4, wherein said base is an ammonium base.

6. A process as in claim 4, wherein said base is an alkali metal base.

7. A process as in claim 6, wherein said base is sodium hydroxide.

8. A process for manufacturing a detergent composition which comprises forming a blend by intermixing soap with a 2-dioxy-3,3,4-trihydro-4-alkyl-6-lower alkyl-1,2,5-oxathiazine compound having the formula

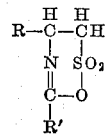

wherein R is an alkyl group containing from 12 to 20 carbon atoms and R' is an alkyl group containing not more than ten carbon atoms, and hydrolyzing said 2-dioxy-3,3,4-trihydro-4-alkyl-6-lower alkyl-1,2,5-oxathiazine compound to the corresponding vicinal acylamido sulfonate by heating said blend in contact with an alkali metal base, the weight ratio of oxathiazine compound to soap initially present in said blend being from 5:100 to 70:100.

9. A process as in claim 8, wherein said alkali metal is sodium.

10. A process for manufacturing a detergent composition which comprises forming a blend by intermixing soap with an oxathiazine compound having the formula

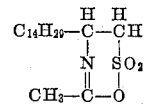

and hydrolyzing said oxathiazine compound to the corresponding 2-acetamido hexadecane-1-sulfonate by heating said blend in contact with a base selected from the group consisting of alkali metal, alkaline earth metal, and ammonium bases; the amount of said oxathiazine compound in said blend being from about 10 to about 50 weight percent, based on the combined weights of said soap and said oxathiazine compound.

11. A process as in claim 10, wherein said base is an alkali metal base.

12. A process as in claim 11, wherein said alkali metal base is sodium hydroxide.

13. A process as in claim 10, wherein said oxathiazine compound is 2-dioxy-3,3,4-trihydro-4-n-tetradecyl-6-methyl-1,2,5-oxathiazine.

14. A process as in claim 10, wherein said oxathiazine compound is 2-dioxy-3,3,4-trihydro-4-n-tetradecyl-6-ethenyl-1,2,5-oxathiazine.

15. A process as in claim 10, wherein said oxathiazine compound is 2-dioxy-3,3,4-trihydro-4-n-tetradecyl-6-phenyl-1,2,5-oxathiazine.

16. A process as in claim 10, wherein said oxathiazine compound is 2-dioxy-3,3,4 - trihydro-4-n-tetradecyl-6-hydro-1,2,5-oxathiazine.

(References on following page)

References Cited

UNITED STATES PATENTS

| | | | |
|---|---|---|---|
| 2,880,219 | 3/1959 | Burnette et al. | 252—117 X |
| 3,046,231 | 7/1962 | Ernst et al. | 252—117 X |
| 3,076,766 | 2/1963 | Anstett | 252—117 |

OTHER REFERENCES

Bordwell et al.: "Sulfonation of Olefins," J.A.C.S., 76, 3945–3961 (1954).

Hine: Physical Organic Chemistry, 2nd ed., McGraw-Hill Book Co., New York (1962), pp. 238, 290, 294.

Mustafa: "The Chemistry of Sultones and Sultams," Chem. Reviews, vol. 54, pp. 195–211 (1954).

LEON D. ROSDOL, *Primary Examiner*.

ALBERT T. MEYERS, SAMUEL H. BLECH, I. GLUCK, *Examiners*.